(12) United States Patent
Grimes

(10) Patent No.: US 6,434,537 B1
(45) Date of Patent: Aug. 13, 2002

(54) CELLULAR TELEPHONE BILLING MANAGEMENT SYSTEM

(75) Inventor: Gary Joe Grimes, Thornton, CO (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/284,708

(22) Filed: Aug. 1, 1994

Related U.S. Application Data

(63) Continuation-in-part of application No. 08/130,964, filed on Oct. 4, 1993, now abandoned.

(51) Int. Cl.$^7$ ............................................. G06F 17/60
(52) U.S. Cl. ................................... 705/40; 379/114.01
(58) Field of Search ........................ 455/2; 364/464.02, 364/464.04, 467, 401; 379/111, 95, 114, 96, 114.01, 114.17; 235/61, 63, 64; 348/3; 725/2; 705/10, 14, 20, 40

(56) References Cited

U.S. PATENT DOCUMENTS

| | | | |
|---|---|---|---|
| 4,051,998 A | * 10/1977 | Zabel | 364/465 |
| 4,065,663 A | * 12/1977 | Edwards, II | 364/464 |
| 4,351,028 A | * 9/1982 | Peddie et al. | 364/483 |
| 5,109,401 A | * 4/1992 | Hattori et al. | 379/58 |
| 5,220,517 A | * 6/1993 | Sierk et al. | 364/550 |
| 5,249,129 A | * 9/1993 | Lamoureux et al. | 364/479 |
| 5,361,297 A | * 11/1994 | Ortiz et al. | 379/130 |

FOREIGN PATENT DOCUMENTS

| | | |
|---|---|---|
| EP | 0526118 | 7/1992 |
| GB | 2134749 | 1/1983 |

OTHER PUBLICATIONS

"Creditfone Brings Benefits of Cellular Telephones to Travelling Public", News Release Jul. 2, 1986, p. 11 Dialog File 16 Acc #01491755.*
Patent Abstracts of Japan, vol. 9, No. 126, Abstract Date May 31, 1985, Patent Date Jan. 25, 1985
Patent Abstracts of Japan, vol. 9, No. 197, Abstract Date Aug. 14, 1985, Patent Date Apr. 10, 1985.
Patent Abstracts of Japan, vol. 15, No. 40, Abstract Date Jan. 30, 1991, Patent Date Nov. 13, 1990.
"Micro Digital™ Personal XL", Motorola Brochure, 1993.
"Portable Cellular Telephone 3610", AT&T Brochure, 1993.

* cited by examiner

*Primary Examiner*—Frantzy Poinvil
(74) *Attorney, Agent, or Firm*—Dilworth & Barrese

(57) ABSTRACT

The present invention is directed to a telephone billing management method for cellular telephones. The objective is to provide the user of a cellular telephone a cost accounting and management tool. The amounts of various classes of service used in the current billing period are downloaded and displayed at the user phone terminal, for instance on the wireless handset. Specifically, cumulative billing information for the present billing period is downloaded and displayed at the user's location during the call set up-period signalling period. The charge rate for the current call can also be downloaded. Once the call is stabilized, the duration (air time) and cost of the present call can be calculated and displayed in real time. Thus, for management purposes, the user has access to the provider's information on all charges up to the present call and the duration and cost of the present call can be calculated and displayed in real-time without further burden on the provider.

17 Claims, 3 Drawing Sheets

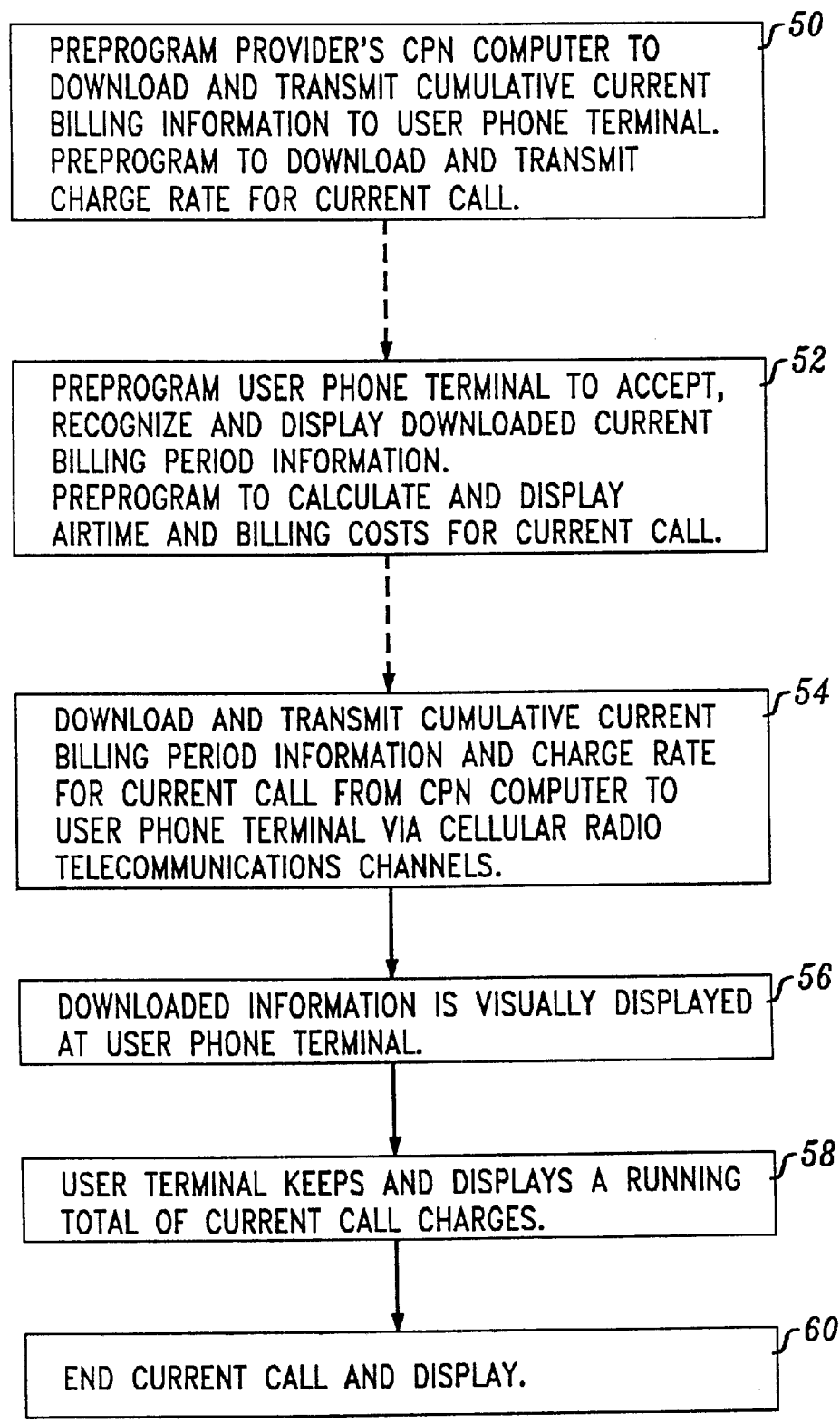

CELLULAR TELEPHONE BILLING MANAGEMENT SYSTEM

CROSS REFERENCE TO RELATED APPLICATIONS

This application is a continuation-in-part of application Ser. No. 08/130,964, filed on Oct. 4, 1993 now abandoned.

BACKGROUND OF THE INVENTION

1. Field of the Invention

The present invention is directed to a telephone billing management method for cellular telephones. Specifically, during the call set up signalling period, cumulative billing information for the present billing period is downloaded and displayed at the user's location and duration and cost of the present call is calculated and displayed.

2. Information Disclosure Statement

U.S. Pat. No. 3,769,463 issued Oct. 30, 1973 to Graham et al teaches an electronic long distance telephone call computer and recorder for computing elapsed time and charges for a particular call as well as means for calculating a cumulative total of charges. General operation of the Graham apparatus requires first ascertaining from a chart the regular and overtime charges for the call to be made and programming that information into the apparatus. No such set-up on the part of the user is necessary with the present invention.

U.S. Pat No. 4,091,238 issued May 23, 1978 to Samuels et al. teaches an apparatus which calculates and displays the accrued cost of a telephone call capable of taking into account local and long distance call rates, message unit areas, etc.

U.S. Pat. No. 5,109,401 teaches a radio telecommunication device for use in an automobile radio communication apparatus (mobile cellular phone) capable of informing a user when a call charge for one call exceeds a preset call charge and which is also capable of stopping speech communication when such preset call charge has been exceeded and which is also capable of informing a user when an accumulated call charge for a plurality of calls exceeds a cumulative preset call charge.

U.S. Pat. No. 5,134,651 issued Jul. 28, 1992 to Ortiz et al teaches a pay telephone arrangement for a mobile phone wherein charges for a particular call are displayed to an owner and a user so that the call can be paid for immediately by the customer.

None of the prior art cited downloads the provider's cumulative billing information for the current billing period during the call set up signalling period before the present call is stabilized as does the present invention. The present invention method provides more foresight and manageability to the subscriber than prior art methods.

SUMMARY OF THE INVENTION

The present invention is directed to a telephone billing management system method for cellular telephones. The objective is to provide the user of a cellular telephone a cost accounting and management tool. The amounts of various classes of service used in the current billing period are downloaded and displayed at the user phone terminal, for instance on the wireless handset. Specifically, cumulative billing information for the present billing period is downloaded and displayed at the user's location during the call set up-period signalling period. The charge rate for the current call can also be downloaded. Once the call is stabilized, the duration (air time) and cost of the present call can be calculated and displayed in real time. Thus, for management purposes, the user has access to the provider's information on all charges up to the present call and the duration and cost of the present call can be calculated and displayed in real-time without further burden on the provider.

BRIEF DESCRIPTION OF THE DRAWINGS

FIG. 3 illustrates a diagrammatic representation of some preferred embodiments of the present invention.

DETAILED DESCRIPTION OF THE PRESENT INVENTION

Figure 1:
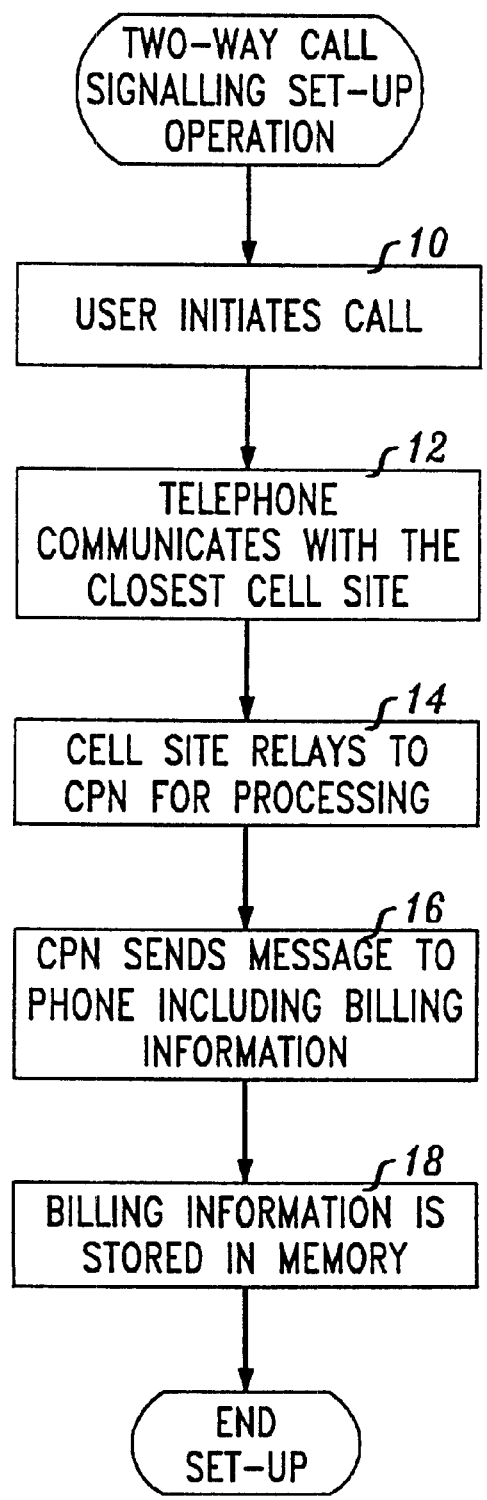
FIG. 1 is a flow diagram of a two-way call signalling set-up period and the downloading of billing information.

Subscribers to cellular telephone services typically do not know how much of each grade of service they have used during a billing period until they get their monthly statements. If they had knowledge of this information as they went along, they could reduce their charges. For example a cellular operator may charge a premium rate per minute of air time in prime time and a much reduced rate per minute of air time in off peak hours. Subscribers may be obliged to agree to be billed for a minimum of, for instance, three hours of air time per month. At the end of the month, if the minimum time is not used, the portion may be billed at the higher rate. It is thus to the advantage of users to be able to tell how much time they have used and be able to use enough low rate air time to finish their minimum number of billable hours before the end of their billing cycle to avoid being billed at the higher rate. Other types of billing obligations and arrangements with different providers also exist. Regardless of the type of arrangement, access to the provider's cumulative billing information for a current billing period when placing an upcoming call would translate into a valuable management tool for the user. The present invention billing management method makes such information available to subscribers and includes the advantage of also displaying billing information for the current call with no added burden to the provider. Cellular telephone systems incorporating this feature may have a significant advantage in the market place at very little added manufacturing cost.

The cellular telephone systems according to the present invention include known real-time call processing node computers and a plurality of cellular telephones having display units. For example, the cellular telephone system's real-time call processing computer may be a 3B15 Call Processing Node (CPN) computer manufactured by AT&T. The CPN computer includes an MC68030 microprocessor or equivalent processing circuitry, memory and known cellular communication circuitry having an IS54B standard interface to transmit billing information along with the audio information. The CPN computer includes stored programs for monitoring and storing billing information including current and cumulative billing for each cellular phone or account. The stored programs further include control software for transmitting selective portions of the current and cumulative billing information to respective telephones. Preferably, the billing information is transmitted or downloaded to a respective cellular telephone during a signalling set-up period initiated by a user when beginning a current call.

The billing information is based upon various factors including, for example, the subscribers directory number, the time stamp when a cell begins and which cells are utilized during the call, the called telephone number, the elapsed air time used, and the PSTN facilities-used. Other factors which may affect the billing information includes call waiting and call conferencing features utilized.

FIG. 1 illustrates an exemplary flow diagram of the downloading of billing information during a signalling set-up period. To initiate a call from a cellular telephone, the user dials the desired telephone number and broadcasts the dialed number, typically by pressing a send key (step 10). The cell cite closest to the telephone receives the dialed number and associated identification information and relays the information to the CPN (steps 12 and 14). The CPN processes the information, including verifying the subscriber (step 14). Upon satisfactory completion of the subscriber information processing, the CPN sends information to the telephone, including information to tune the audio circuitry to a voice channel and the current and cumulative billing information (step 16). The billing information received by the telephone is stored in internal memory to permit the telephone to display the information and to calculate, update and maintain the cost of the current call. The current call cost can then be displayed on the display in the telephone handset.

Figure 2:
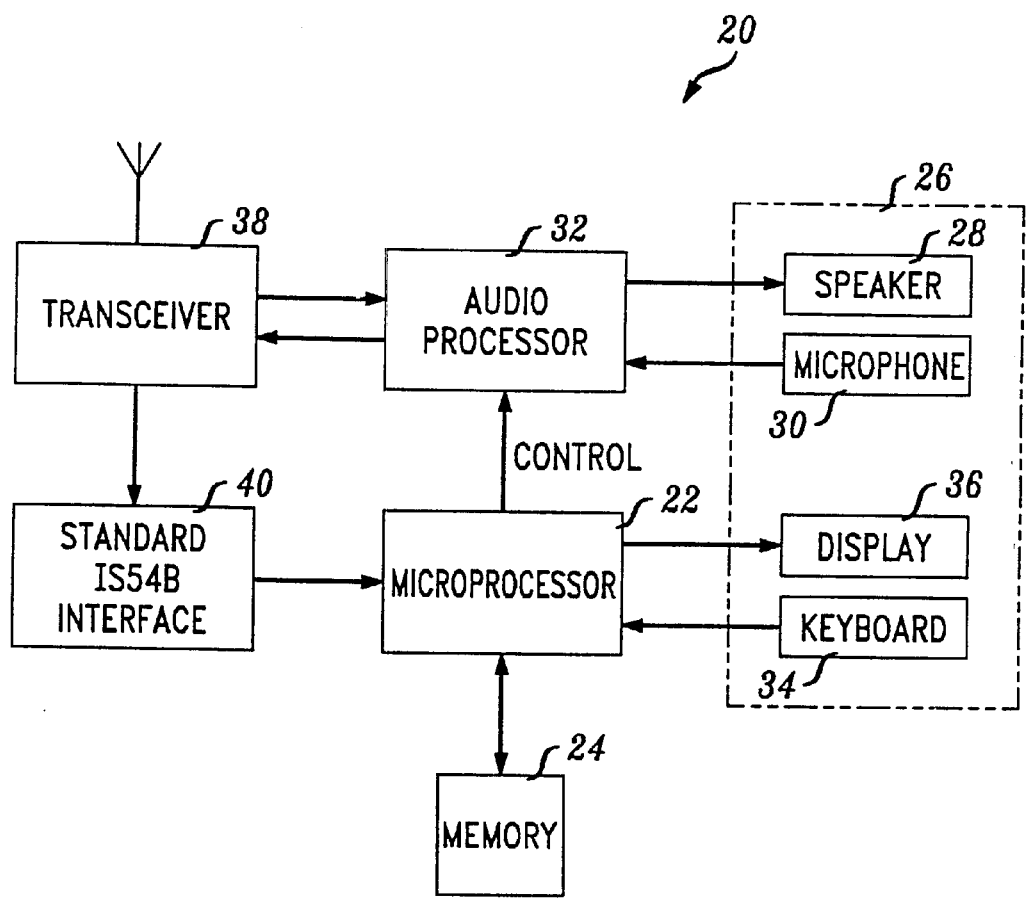
FIG. 2 is a block diagram of an exemplary cellular telephone.

Referring to FIG. 2, an exemplary block diagram of a cellular telephone contemplated for the billing management system of the present invention is shown. Preferably, the telephone utilizes a time division multiple access (TDMA) transmission scheme with a IS54B standard interface, which will be described in more detail below. In this embodiment, the cellular telephone 20 includes microprocessor 22, memory 24 and handset 26. Memory 24 may include RAM, PROM and EEPROM memory for storing system and application programs as well as information, such as billing, scratch pad, key stroke and active channel information. The system and/or application programs include software for recording, processing and displaying the billing information downloaded from the CPN computer.

Continuing to refer to FIG. 2, audio processor 32 controls the audio processing circuitry which processes the audio signal received from transceiver 38 and routes the audio signal to speaker 28. The audio processor 32 also controls the audio processing circuits which receive the audio signal from microphone 30 and transfer the signal to transceiver 38 for broadcast transmission.

The transceiver 38 is also coupled to IS54B interface 40 which extracts the billing information from the signal received by the transceiver, in response to instructions from microprocessor 22. Microprocessor 22 stores the billing information in memory 24. An example of a suitable cellular telephone is the model 3610 manufactured by AT&T adapted to incorporate a TDMA transmission scheme and the IS54B standard interface. Another example of a suitable cellular telephone is the Micro Digital™ Personal XL manufactured by Motorola.

As noted above, during the two way call set up signalling period, information regarding cumulative air time and billing for the particular caller are downloaded from the provider's billing computer and visually displayed at the user's location, for instance on the display located on the user's handset. Other types of displays are also possible. The two way call set-up signalling period is known in the art and refers to the period of time in which messages travel back and forth between the user phone and the provider until the actual call is stable.

In the present invention, the provider's base station CPN computer is preprogrammed to download billing information in the two way call set-up massaging so that during call set-up, the present billing information for each class of service for the present billing period is downloaded into the user phone terminal along with all necessary information (charges per minute, etc.) of the present call so that the user phone terminal maintains a running total of the time and dollar amount for the class of service currently being used.

Once the call is stabilized and in progress, air time and billing in real time are displayed to the user at the user's location and may optionally be added to the previous cumulative data for an updated cumulative total display. Such information could include, for example, the amount of each priority of service (prime time, evening and weekend, etc.) used so far in the current billing period. The priority of service of the current call would also be downloaded (or figured out from a local clock) and the amount of time used in that class of service could be incremented and displayed throughout the current call. Thus, for management purposes, the user would have the provider's information on all charges up to the present call and the duration and cost of the present call could be calculated in real-time without further burden on the provider. Other possible features include displaying whether or not a user is ahead or behind schedule in using certain minimum billing amounts for the billing period. For example, in off hours, a user might be 70% through the billing period and have used only 35% of the minimum allotment.

Referring now to FIG. 3 there is shown a flow diagram for a telephone billing management system method for a cellular telephone system having at least one provider with a CPN computer or equivalent real-time communication processor, and a plurality of user phone terminals with display units. As described above, the user phone terminal is a state of the art cellular telephone equipped with known microprocessor and support circuitry, audio processing circuitry as well as an IS54B standard interface. As noted above, these components are capable of being programmed to carry out the method of the present invention. In FIG. 3, steps 50 and 52 are shown which involve preparing the system for using the method of the present invention, and steps 54 through 60 show an embodiment involving the billing display steps of the present invention.

Thus, in step 50 the provider's CPN computer is preprogrammed to download cumulative current billing period information and transmit, via cellular radio telecommunication channels, billing information to at least one user phone terminal during the two-way call signalling set-up period. In addition to cumulative current billing information the computer could be preprogrammed to download all necessary charge rate information (e.g., charge rate per minute) of the present call to allow the user phone terminal to maintain a running total of the air time charges for the class of service being used during the current call. In step 52 the user phone terminal is preprogrammed to receive, process and display downloaded current billing period information transmitted from the CPN computer. It should be noted that the visual display unit could also be located on the cradle housing of the cellular phone or elsewhere in the vicinity of the user.

In addition to receiving, processing and displaying cumulative current billing period information, the user phone terminal could also be preprogrammed to keep a running total of the air time and charges for the class of service being used during the current call and to display this to the user. Having preprogrammed the provider's billing computer and a user phone terminal to perform these functions, the system may now be used to implement the billing display and calculations.

Referring again to FIG. 3, in step 54, after initiation of a signalling set-up period, the cumulative current billing period information is downloaded from the provider's CPN computer to the user phone terminal, via cellular radio telecommunications channels. In step 56 the downloaded information is visually displayed to the user. Such visual displays are known in the art and are currently used for imparting to the user various types of information, for example, identifying the phone number of a calling party. The display unit could be a light emitting diode (L.E.D.) display unit or other digital display unit. In step 58 the user phone terminal keeps a running total of the air time and charge for the class of service being used during the current call and displays this to the user. In step 60 the call is ended, thus ending the running calculation for current call charges as well as the visual display. The call may be ended, for example, by the user replacing the phone in its cradle, pressing an appropriate button on the handset or cradle or any other means known in the art.

Obviously, numerous modifications and variations of the present invention are possible in light of the above teachings. It is therefore understood that within the scope of the appended claims, the invention may be practiced otherwise than as specifically described herein.

What is claimed is:

1. A telephone billing management method for a cellular telephone system having at least one provider with a real-time node computer and a plurality of user phone terminals with display units, said method comprising the steps of:

preprogramming the provider's real-time node computer to download cumulative current billing period information and transmit via cellular radio telecommunication channels said information to at least one of the user phone terminals during a two-way call signalling set-up period initiated by a user when beginning a current call; and downloading and transmitting from the provider's real-time node computer said cumulative current billing period information to the user phone terminal during said two-way call set-up period via the cellular radio telecommunications channels, the user phone terminal being capable of displaying said current billing period information on the display unit.

2. The method of claim 1, wherein said step of preprogramming the real-time node computer further includes preprogramming the real-time node computer to download and transmit charge rate information for said current call, wherein said user phone terminal is capable of displaying said charge rate information for said current call on the display unit.

3. The method of claim 2, wherein said cumulative current billing period information is the amount of each grade of service used so far in said current billing period.

4. The method of claim 1, wherein said cumulative billing period information is the amount of each grade of service used so far in said current billing period.

5. The method of claim 2, wherein said charge rate information is charge rate per minute for said current call.

6. A telephone billing management method for displaying information on at least one user phone terminal, each said user phone terminal having an associated display unit, said method comprising the steps of:

preprogramming the at least one user phone terminal to receive cumulative current billing period information from a service provider;

receiving said cumulative current billing period information from the service provider by the at least one user phone terminal during a two-way call set-up period; and displaying said received cumulative current billing period information on the display unit of the associated user phone terminal.

7. The method of claim 6, further comprising a step of preprogramming the user phone terminal to calculate and display air time and billing costs from said charge rate information for said current call, and further comprising calculating said air time and billing costs for said current call and displaying said air time and billing costs for said current call on the display unit.

8. The method of claim 7, wherein said cumulative current billing period information is the amount of each grade of service used so far in said current billing period.

9. The method of claim 7, wherein said charge rate information is charge rate per minute for said current call.

10. The method of claim 6, wherein the display unit is located on a handset of the user phone terminal.

11. The method of claim 10, wherein the display unit is a digital display unit.

12. The method of claim 11, wherein the digital display unit is an L.E.D. display unit.

13. The method of claim 6, wherein the display unit is located on a cradle housing of the user phone terminal.

14. The method of claim 13, wherein the display unit is a digital display unit.

15. The method of claim 14, wherein the digital display unit is an L.E.D. display unit.

16. The method of claim 6, wherein the display unit is a digital display unit.

17. The method of claim 16, wherein the digital display unit is an L.E.D. display unit.

* * * * *